US011363072B1

(12) United States Patent
Relan

(10) Patent No.: US 11,363,072 B1
(45) Date of Patent: Jun. 14, 2022

(54) IDENTIFYING AND MITIGATING VULNERABLE SECURITY POLICIES

(71) Applicant: Amazon Technologies, Inc., Seattle, WA (US)

(72) Inventor: Vivek G Relan, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 440 days.

(21) Appl. No.: 16/520,156

(22) Filed: Jul. 23, 2019

(51) Int. Cl.
*G06F 21/00* (2013.01)
*H04L 9/40* (2022.01)
*G06F 9/451* (2018.01)

(52) U.S. Cl.
CPC ............ *H04L 63/205* (2013.01); *G06F 9/451* (2018.02); *H04L 63/1433* (2013.01)

(58) Field of Classification Search
CPC .... H04L 63/205; H04L 63/1433; G06F 9/451
See application file for complete search history.

(56) References Cited

U.S. PATENT DOCUMENTS

| 9,749,305 | B1* | 8/2017 | Sharifi Mehr | ........ G06F 21/606 |
| 10,374,800 | B1* | 8/2019 | Sharifi Mehr | ...... H04L 63/0428 |
| 10,432,406 | B1* | 10/2019 | Amdahl | ................ H04L 9/0825 |
| 2021/0288895 | A1* | 9/2021 | Wu | ........................ H04L 43/12 |

* cited by examiner

*Primary Examiner* — Kendall Dolly
(74) *Attorney, Agent, or Firm* — Lee & Hayes, P.C.

(57) ABSTRACT

This disclosure is directed to technologies for identifying and mitigating vulnerable security policies. Using techniques described herein, vulnerable or "weak" ciphers may be identified and updated before the use of the weak security policies and/or weak ciphers cause a disruption in service. A cipher agent may be authorized to monitor the SSL handshake messages which negotiate SSL ciphers and protocols happening from and to a server application. The cipher agent identifies the security policies and/or the ciphers that are utilized by the client application and determines whether the ciphers are weak ciphers. The cipher agent stores security data associated with security policies and ciphers supported by the client device. The cipher agent may store this data in a log, and/or make it available to the client and/or one or more services for further action.

20 Claims, 10 Drawing Sheets

US 11,363,072 B1

IDENTIFYING AND MITIGATING VULNERABLE SECURITY POLICIES

BACKGROUND

Today, the Internet is utilized to transmit large amounts of confidential data. The confidential data may include personal information such as banking information, phone numbers, credit card numbers, account information, and the like. Users expect this confidential data to remain secure during transmission. For example, the user expects data used during a financial transaction (or some other transaction that utilizes sensitive data) to remain secure such that an unauthorized entity cannot access or compromise the data.

There are many different techniques that can be utilized to secure the confidential data as it is being transmitted. For example, the data can be encrypted by a sending computing device and then decrypted by the receiving computing device. In many cases, the sending computing device and the receiving computing device utilize the Secure Sockets Layer (SSL) protocol for establishing an encrypted link between the sending and receiving computing devices. The encrypted link helps to ensure that the data passed between the devices remains private and not compromised. Generally, using SSL, the data is encrypted using an agreed upon cryptographic algorithm, which may be referred to herein as a "cipher". Ciphers used to encrypt the data, however, are constantly being updated to provide stronger and better protection of the data. Failing to update the ciphers utilized, however, may result in data breaches and/or application availability.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
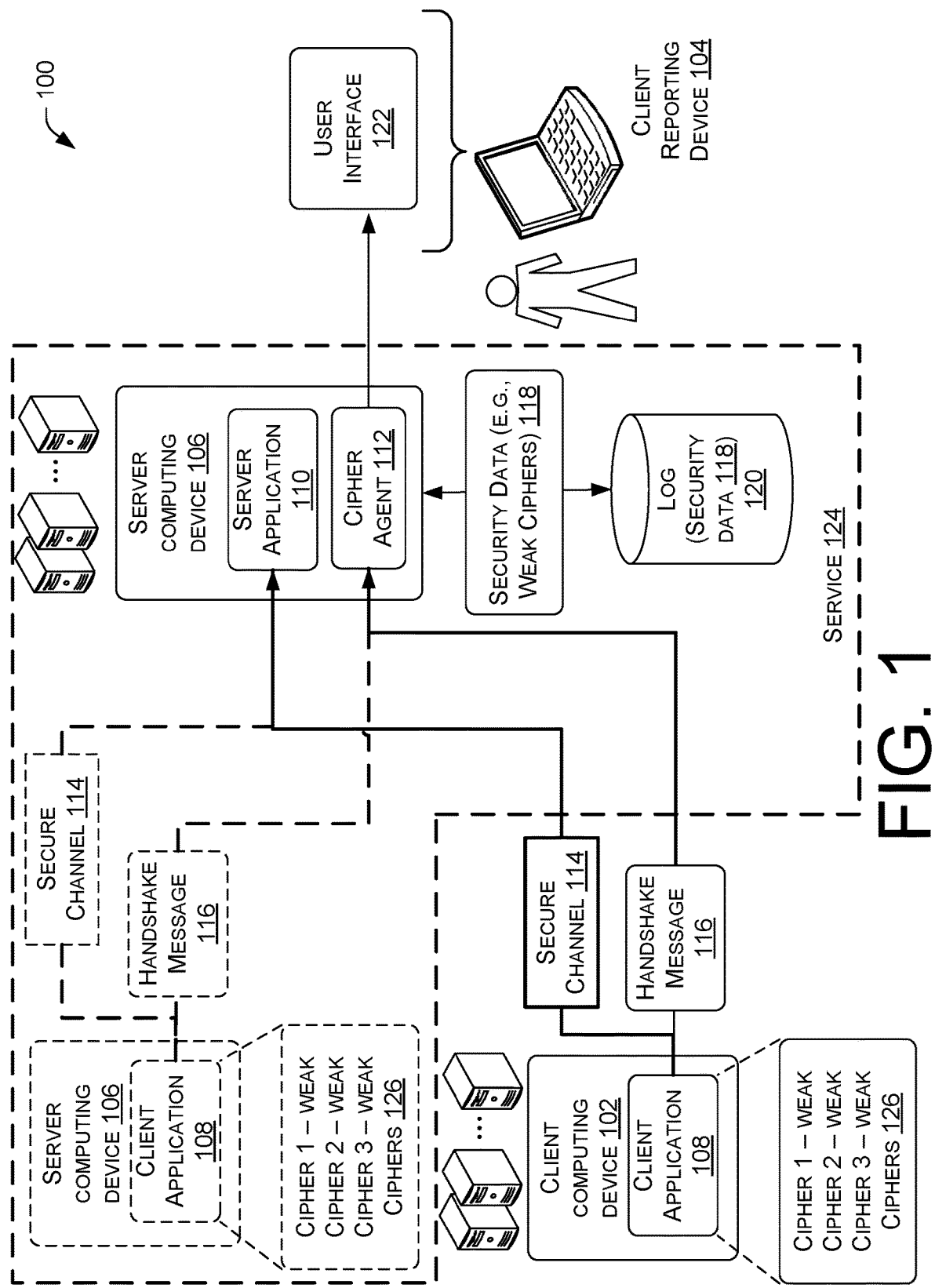
FIG. 1 is a software and network architecture diagram showing aspects of the configuration and utilization of a cipher agent to identify and assist in mitigating vulnerable security policies.

The following detailed description is directed to technologies for identifying and mitigating vulnerable security policies. Using techniques described herein, vulnerable or "weak" security policies and/or ciphers may be identified and updated before the use of the weak security policies and/or weak ciphers cause a disruption in service. In many cases, it can be difficult for a user to stay up to date with the recommended ciphers. For example, it may be time consuming to update applications and an infrastructure to utilize the newer, stronger ciphers without impacting application availability. It can also be difficult to determine what applications are not utilizing the recommended ciphers. This can result in a long time between detecting and mitigating SSL communications that may be compromised.

Generally, a security policy is a combination of protocols and ciphers. The protocol establishes a secure connection between two computing devices, such as between a client computing device and a server computing device. The security policy helps to ensure that data passed between the client and the server is protected. A cipher is an encryption algorithm that uses encryption keys to create a coded message. Protocols may use several ciphers to encrypt data over the internet. Secure Sockets Layer (SSL) and Transport Layer Security (TLS) are cryptographic protocols that are used to encrypt confidential data over insecure networks such as the Internet. The TLS protocol is a newer version of the SSL protocol. As used herein, SSL, or SSL protocol, may refer to both SSL and TLS protocols.

As briefly discussed above, it can be difficult for a user, such as a customer of a service provider network, to stay up to date and utilize the recommended security policies and ciphers. Not only are there are large number of ciphers that may be utilized, there can be frequent updates to the ciphers. Not staying up to date, however, can cause major disruptions for the customer and services used by the customer.

For instance, SSL applications of the user that do not utilize the recommended ciphers may not be able to establish a link and communicate with SSL applications that do utilize the recommended ciphers. In many cases, when an update is made to an SSL application, the updated application may enforce the use of stronger ciphers and protocols that are not supported by the client application. Instead, the client application may only utilize weak ciphers. As used herein, a weak cipher is as an encryption/decryption algorithm that opens up the probability that the encryption scheme could be "broken" or "cracked". In many cases, a weak cipher may use a key size that is less than 128 bits. A "broken" or "cracked" cipher may also be determined by accessing one or more data sources (e.g., a security document) provided by a trusted security entity and/or defined by a current standard of the SSL protocol that indicates a cipher is no longer recommended. A strong cipher is an encryption/decryption algorithm that has a low probability of being broken or cracked. A weak cipher has a higher probability of being broken or cracked compared to a strong cipher. In some examples, a strong cipher is a cipher that is currently recommended by a trusted security entity and/or defined by a current standard of the SSL protocol. Generally, a strong cipher is a cipher that has not been determined to be insecure and a weak cipher is a cipher that has been broken or cracked.

In these cases, the SSL application that does not utilize the updated application will fail when attempting to utilize the updated SSL application. Determining the cause of the failure, however, can be difficult.

Utilizing the technologies and techniques described herein, a user is informed of the use of weak protocols and/or ciphers (that may become unsupported) that are being utilized by applications of the user before a disruption occurs. In some configurations, the client application is not altered, changed, or updated to include functionality described herein. Stated another way, no changes are needed to be made to the client application in order to be informed of possible security vulnerabilities associated with weak security policies and/or ciphers. Being aware of the use of weak ciphers allows the user time to update applications to meet compliance with recommended security policies. As such, application down time may be reduced or eliminated. Moreover, use of weak ciphers, when stronger ciphers are available, likely causes increased latency, reduced network bandwidth, potential security breaches (e.g., unauthorized access to data that is maintained by, transmitted by, and/or transmitted to a server device and/or a client device), and other computer-related issues. Updating of the weak ciphers with stronger ciphers can avoid these technological problems.

According to some examples, a user, such as a customer of a service provider network, authorizes a service provider, or some other entity, to monitor for security compliance. For instance, the customer may authorize the service provider to monitor messages (i.e., SSL handshake messages) that request a secure communication channel. The authorization may be for all or a portion of secure communication messages associated with the account of the customer.

After authorization, a cipher agent may be configured to monitor the SSL handshake messages that negotiate SSL ciphers and protocols. The cipher agent may be executed by a computing device, such as by a Virtual Machine (VM) instance to which the client device is initiating the request for secure communication. The cipher agent is configured to monitor messages, such as SSL handshake messages, that occur for that instance. Other cipher agents may monitor other instances that have been authorized to allow monitoring.

According to some configurations, the cipher agent identifies the security policies and/or the ciphers that are utilized by the client device. The cipher agent may determine that all or a portion of the ciphers are weak ciphers. For example, the cipher agent my access a current list of recommended ciphers and compare that list to the ciphers supported by the client device. A weak cipher is a cipher that is vulnerable to a security breach. In some cases, weak cyphers may not be supported by either a client computing device or a server computing device. As such, a secure communication may not be established.

The recommended ciphers may be determined from different data sources. For instance, the cipher agent may access a public list of recommended ciphers. In some cases, while a cipher of the client may be currently supported, the cipher may be becoming obsolete. This may be determined using different techniques. For example, the cipher may be old, may be considered adequate, but not a "strong" cipher and the like. In other cases, all of the ciphers of the client device may not be included in the currently recommended ciphers.

In some examples, the cipher agent stores security information associated with security policies and ciphers supported by the client device. The cipher agent may store this security data in a log, and/or make it available to one or more services for further action. In other examples, the cipher agent stores data about the ciphers that are not supported, or will become unsupported (i.e., the weak ciphers). According to some configurations, all or a portion of this data may be accessed by an authorized user associated with the client device.

In some examples, this security information may be provided within a user interface (e.g., a security pane). The information displayed may include different types of information, such as but not limited to how many SSL communications are occurring to and from one or more instances that utilize weak ciphers, the weak ciphers utilized, and recommended steps to mitigate these security risks. Using the security pane, a customer can view which entities (either clients or servers) are involved in weak SSL communication. The customer may then act to update these entities either automatically in an automated or partially automated manner and/or manually.

According to some configurations, the service provider may determine that a customer is not compliant with current security recommendations but not enforce the current security recommendations before the customer is able to update and test the updated ciphers and protocol. In these cases, the service provider may utilize a previous version of an instance that supports at least one of the ciphers supported by the customer. In other words, the service provider may provide more than one version of the application that the customer application is attempting to utilize. In this way, the application of the customer will not experience a major disruption in service before being able to be updated to the recommended security ciphers and protocols. As a result, the customer will have confidence in updating to strong ciphers ensuring both application security and availability.

As briefly discussed, the cipher agent may report the data to one or more other services or components. For example, the cipher agent may provide data that can be used to capture different statistics such as count of SSL communications by SSL cipher and SSL protocol. These statistics may be provided to a monitoring service. The monitoring service may be configured to collect and track metrics, collect and monitor log files, set alarms, and automatically react to detected changes. For example, the monitoring service may be configured to inform the customer when a security cipher is out of date, and/or when the cipher is no longer supported. The customer can use these insights to react and keep the application running smoothly and compliant with the latest security ciphers.

As an example, imagine that a client application utilizes a load balancing application provided by a service provider. The load balancing application is typically updated to utilize the most recently recommended security protocols and ciphers. The client application, on the other hand, that is maintained by a customer of the service provider may not be updated as frequently. As a result, as more time passes since the client application has been updated, the supported security policies and ciphers may become weaker and unsupported by a current version of the load balancing application.

Prior to techniques described herein, the client application would not be able to establish a communication channel with the load balancing application when the load balancing application no longer supported the now "weak" security policies and cyphers of the client application. As a result, the customer may have significant downtime when determining a cause of the disruption as well as time to update the client application. Using the techniques described herein, however, the client would be informed of "weak" security policies and ciphers that either are no longer supported by the current version of the load balancing application or are becoming weak and will become unsupported in the future. Further, using techniques described herein, the client application may continue to establish a communication channel with a prior version of the load balancing application for at least a period of time such that the client application can be updated, and no downtime is experienced.

While the examples provided herein are described relative to determining weak security policies and/or ciphers, the techniques and systems described herein may be utilized to determine weak security policies and/or ciphers associated with a server application. For instance, in some examples, a server application may be acting as an intermediary between the client application and a second server application (e.g., the client application may be communicating with a load-balancing server application that is in turn communicating with the second server application. In these cases, the second server application may identify weak security policies and/or ciphers associated with the load-balancing server application. The techniques and systems described herein may be implemented in a number of ways. Example implementations are provided below with reference to the following figures.

FIG. 1 is a software and network architecture diagram showing aspects of the configuration and utilization of a cipher agent 112 to identify and assist in mitigating vulnerable security policies. As illustrated, FIG. 1 includes one more client computing devices 102, one or more server computing devices 106, and one or more client reporting devices 104. The computing devices 102, 104, and/or 106 may be physical computing devices and/or virtual machines executing on one or more physical computing devices. For example, a server computing device 106 may be a virtual machine, a remote machine, an instance of a machine that serves request from multiple devices, or any other type of computing configuration that responds to requests from a client computing device, or other computing devices, and is configured to execute an operating system, such as Windows®, Linux®, Unix® or other operating systems. The devices may communicate by transmitting information using one or more networks, including wired and/or wireless networks.

The computing devices may utilize a variety of resources, such as but not limited to data processing resources, such as virtual machine ("VM") instances, data storage resources, networking resources, data communication resources, network services, and other types of resources. The computing resources utilized can be general-purpose or can be available in a number of specific configurations. For example, data processing resources can be available as physical computers or VM instances in a number of different configurations. The VM instances can be configured to execute applications, including web servers, servers, media servers, database servers, network services, security services, and/or other types of programs. Data storage resources can include file storage devices, block storage devices, and the like.

As briefly discussed above, it can be difficult for a user, such as a customer of a service provider network, to stay up to date and utilize the recommended security policies. Not only are there are large number of ciphers that may be utilized, there can be frequent updates to the ciphers. Not staying up to date, however, can cause major service disruptions for a customer attempting to use applications that utilize ciphers that are no longer supported by a server application. For instance, SSL applications of a user that do not utilize the recommended ciphers may not communicate with SSL applications that do utilize the recommended ciphers.

In many cases, when an update is made to an SSL application, the updated application may enforce the use of stronger ciphers and protocols that is not supported by the user. In these cases, the SSL application that does not utilize the updated application will fail when attempting to utilize the updated SSL application. Determining the cause of the failure, however, can be difficult.

Utilizing the technologies and techniques described herein, a user, such as a customer of the service 124 provided by a service provider, is informed of the use of weak ciphers (that may become unsupported) that are being utilized by applications of the user before a disruption occurs. Being aware of the use of weak ciphers allows the customer time to update applications to meet compliance with recommended security policies. As such, application down time may be reduced and/or eliminated. The service 124 can be a cloud provider network, or "cloud," which refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load.

According to some examples, a user, such as a customer of a service provider network, authorizes the service provider to monitor for security compliance. For instance, an authorized user of the client security device 104 may authorize one or more cipher agents 112 (or some other component) to monitor messages that are utilized in establishing the secure channel 114. In other words, the customer can "opt-in" to allow monitoring of the establishment of secure channels for all or a portion of the secure channel requests. The authorization may be for all or a portion of the messages that request a secure communication channel 114 associated with the account of the customer.

After authorization, a cipher agent 112 is configured to monitor the SSL handshake messages 116 that negotiate SSL ciphers and protocols happening from and to a server computing device 106. In some examples, the cipher agent 112 executes on a virtual machine instance that also executes the server application 110 monitors SSL handshake messages 116 received from client application 108. In some configurations, the SSL handshake messages 116 may be monitored without making any changes to the client application 108. The SSL handshake process may utilize more than one message. As used herein, the SSL handshake message 116 refers to the process that involves a number of steps that may include a request by the client computing device 102 to establish secure communication between the client computing device 102 and the server computing device 106, along with information that identifies the supported ciphers and SSL/TLS versions of the client computing device 102. The server computing device 106 may choose a cipher from the supported ciphers provided by the client computing device 102. In other cases, the server computing device 106 may not support the ciphers provided by the client computing device 102, in which case a secure communication would not be established.

According to some configurations, the cipher agent 112 is configured to execute on virtual machine instances that have been authorized by the customer for monitoring. The cipher agent 112 can be configured as a "listener" process that monitors for connection requests. As briefly discussed, the client computing device 102 and the server computing device 106 use a SSL negotiation configuration to negotiate SSL connections between the client and the server.

Using the SSL negotiation configuration, a secure channel 114 is attempted to be established between the client computing device 102 and the server computing device 106 to help ensure that data passed between the client computing device 102 and the server computing device 106 is private and unaltered. During the connection negotiation process, the client computing device 102 and the server computing device 106 may exchange a list of ciphers and protocols that they each support in one or more handshake messages 116, in order of preference. In some examples, the first cipher on the list associated with the server computing device 106 that matches any one of the ciphers identified by the client computing device 102 is selected for the secure connection. In some examples, the client computing device 102 may not present any ciphers that are supported by the server application 110. In other words, the client application 108 is utilizing weak ciphers that are no longer supported by the current version of the server application 110. The cipher agent 112 may determine that all or a portion of the ciphers 126 are weak ciphers.

In the current example, the client application 108 supports weak ciphers. In some examples, the cipher agent 112 may access a current list of recommended ciphers and use information from the list to determine the strength of the ciphers 126 supported by the client application 108 on the client computing device 102. The recommended ciphers may be determined from different data sources. For instance, the cipher agent 112 may access a public list of recommended ciphers, use the list of ciphers supported by the server application 110, and the like. In some cases, while a cipher of the client application 108 may be currently supported, the cipher may be close to becoming weak. This may be determined using different techniques. For example, an age of the cipher may be used (e.g., the older a cipher, the weaker it may be), a strength rating of the cipher (e.g., determined from a security report), and the like.

According to some configurations, the cipher agent 112, or some other component, may determine that a customer is not compliant with current security recommendations based on determining that the supported ciphers are weak but not enforce the current security recommendations before the customer is able to update and test the updated ciphers and protocol. In these cases, the cyber agent 112 may select and cause a previous version of a server application 110 that supports at least one of the ciphers to be utilized by the client application 108. In other words, the service provider may provide more than one version of the server application 110 that the client application 108 is attempting to utilize. In this way, the client application 108 of the customer will not experience a major disruption in service before being able to be updated to the recommended security ciphers and protocols. As a result, the customer will have confidence in updating to strong ciphers ensuring both application security and availability.

In some configurations, the cipher agent 112 stores security data 118 associated with security policies and ciphers supported by the client device 102. The cipher agent 112 may store this data in a log, such as log 120, and/or make it available to one or more services for further action. In other examples, the cipher agent 112 stores security data 118 about the ciphers that are not supported, or will become unsupported (i.e., the weak ciphers). According to some configurations, all or a portion of this security data 118 may be accessed by an authorized user associated with the client device 102.

All or a portion of the security data 118 may be provided within a user interface (e.g., a security pane) 122. The information displayed may include different types of information, such as but not limited to how many SSL communications are occurring to and from one or more instances that utilize weak ciphers, the weak ciphers utilized, and recommended steps to mitigate these security risk. Using the security pane displayed within user interface 122, a customer can view which entities (either clients or servers) are involved in weak SSL communication. The customer may then act to update these entities either automatically and/or manually.

The user interface 122 may be a graphical user interface familiar with most users that may enable use of various input devices (e.g., cursor selection, dragging objects, etc.), and may enable immersive visual outputs. The user interface 122 may replicate an environment provided by a computing instance, which is sometimes referred to as a remote desktop, which may look and feel like a local operating system, but is provided by a remote computing instance, such as a computing instance provided by one or more server computing devices 106.

In some configurations, the cipher agent 112 may report the security data 118 to one or more other services or components. For example, the cipher agent 112 may provide data that can be used to capture different statistics such as count of SSL communications by SSL cipher and SSL protocol. These statistics may be provided to a monitoring service (not shown). The monitoring service may be configured to collect and track metrics, collect and monitor log files, set alarms, and automatically react to detected changes. For example, the monitoring service may be configured to inform the customer when a security cipher is out of date, and/or when the cipher is no longer supported. The customer can use these insights to react and keep the application running smoothly and compliant with the latest security ciphers.

The client computing device 102 and/or the client reporting device 104 may interact with the server computing device 106 for authentication purposes. Functionality of the server computing device 106 may determine an identity of the user of the client computing device 102, and may determine access privileges, possibly via a user account associated with the user. In some configuration, the user is a customer of a service provider network that makes computing resources available for use to customers.

In some examples, the client computing device 102 executes a client application 108 that opens a connection with the server computing device 106 to request creation of a secure channel 114. According to some configurations, the client computing device 102 transmits a SSL handshake message 116 to request establishment of the secure channel 114. As is known, and as briefly discussed above, the handshake message 116 may identify supported security policies and ciphers of the client application 108. In other examples, a server computing device 106 that is provided by the service 124 (or some other service) may execute the client application (as indicated by the dashed lines). The server computing device 106 that executes the client application 108 may be the same server computing device 106 that is executing the server application 110 or a different server computing device. Further, the server computing devices 106 may be executing in a same data center or a different data center.

Upon receipt of the handshake message 116, the cipher agent 118, and/or some other component or device, may identify the ciphers and/or the security policies supported by the client application 108. In some configurations, the cipher agent 112 stores the ciphers supported by the client application 108 within log 120 and/or some other data store. The cipher agent 112 may be configured to capture different data. For example, the cipher agent 112 may capture different statistics like count of SSL communications by SSL cipher and SSL protocol. In addition, other metadata may be stored within the log 120, such as time stamps, error messages, event codes, and other types of metadata associated with logs in the log 120. The log data may be utilized by other services that process log information and/or events, such as CloudWatch®, to track supported ciphers, for example. Log data may be used for audits, forensics, and/or other uses.

As briefly discussed above, there are many different security policies that generally can be used and still remain compliant with security recommendations. For example, the following includes a list of exemplary security policies: ELBSecurityPolicy-2016-08; ELBSecurityPolicy-FS-2018-06; ELBSecurityPolicy-TLS-1-2-2017-01; . . . ELBSecurityPolicy-TLS-1-0-2015-04. A client can choose any supported security policy to meet compliance and security standards.

Typically, the names of the most recent predefined security policies include version information based on the year and month that the policy was released. For example, the default predefined security policy is ELBSecurityPolicy-2016-08. Whenever a new predefined security policy or an updated security policy is released, the customer can update a configuration to use that new/updated security policy. At some point in time, a once supported security policy will no longer be supported. As these policies are constantly changing, it can be difficult for a customer to identify policies and/or ciphers that are weak and are to be updated to remain in compliance.

As also briefly discussed above, ciphers are currently changing. Many of the other ciphers are not secure and should be used at your own risk. For instance, some example ciphers currently in use include, but are not limited to: ECDHE-ECDSA-AES128-GCM-SHA256*; ECDHE-RSA-AES128-GCM-SHA256*; ECDHE-ECDSA-AES128-SHA256*; ECDHE-RSA-AES128-SHA256*; ECDHE-ECDSA-AES128-SHA*; ECDHE-RSA-AES128-SHA*; DHE-RSA-AES128-SHA; ECDHE-ECDSA-AES256-GCM-SHA384*; ECDHE-RSA-AES256-GCM-SHA384*; CAMELLIA128-SHA; EDH-RSA-DES-CBC3-SHA; DHE-DSS-AES256-GCM-SHA384; DHE-RSA-AES256-SHA; DHE-DS S-AES128-GCM-SHA256; ADH-CAMELLIA128-SHA; DES-CBC-SHA; RC2-CBC-MD5; KRB5-DES-CBC-SHA; EXP-KRB5-RC2-CBC-SHA; EXP-KRB5-RC4-MD5; and the like.

In some examples, the cipher agent 112 determines the strength rating of ciphers and protocols based on computer security data. In some cases, the strength ratings may come from the security data (e.g., a publication) and/or may be calculated and/or determined using different techniques.

Before the server applications 110 are updated (e.g., updating one or more instances to stronger ciphers and protocol), the customer can test support of those ciphers to affected communication entities quickly and take appropriate measures in reaching out to affected communication entities that can break due to a strong SSL cipher update. As a result, the customer will have confidence in updating to strong ciphers ensuring both application security and availability.

Figure 2:
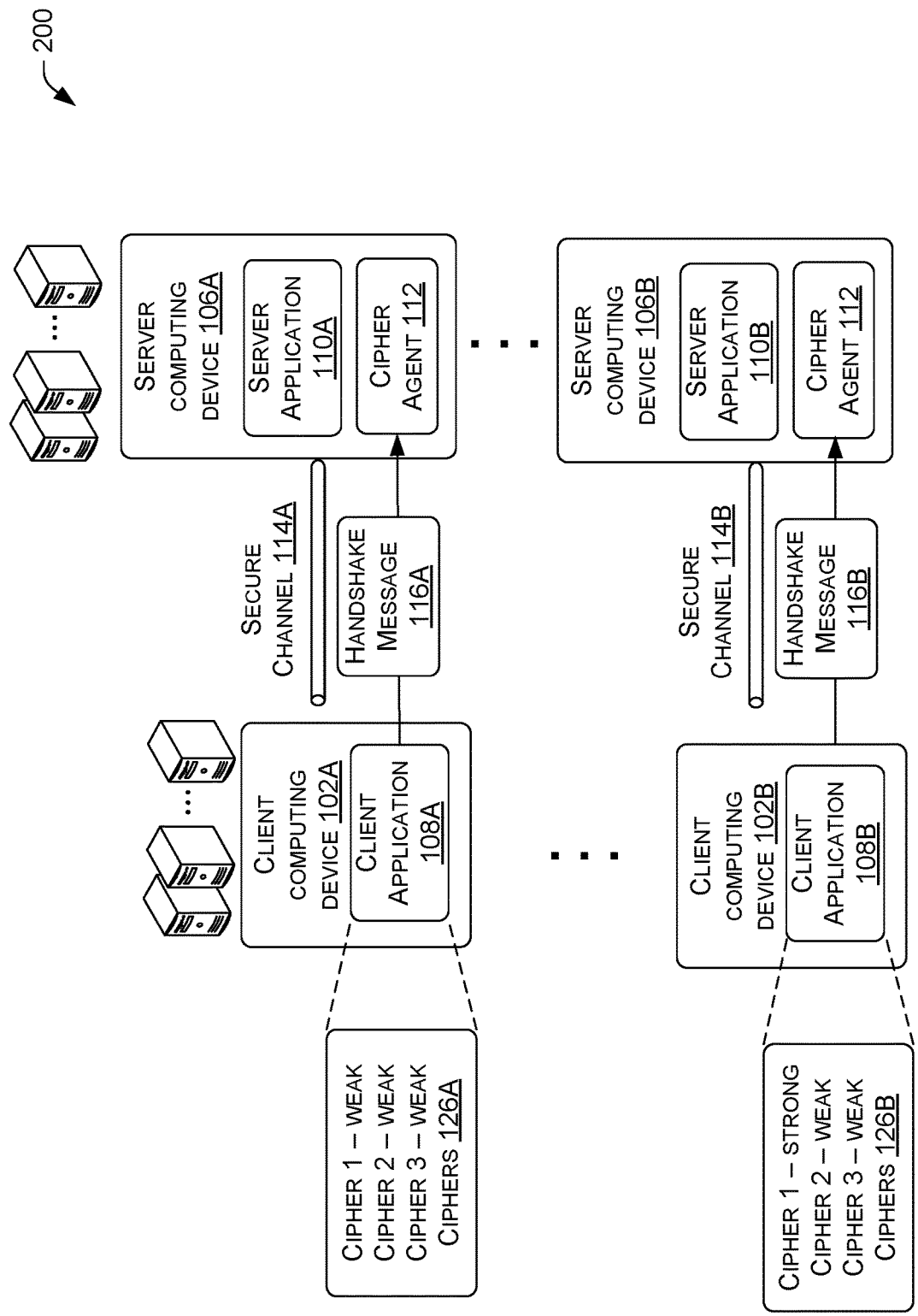
FIG. 2 is a software and network architecture diagram showing aspects of the configuration and utilization of a cipher agent to select a server application based on ciphers supported by the client application.

FIG. 2 is a software and network architecture diagram showing aspects of the configuration and utilization of a cipher agent 112 to select a version of a server application 110 based on ciphers supported by the client application 108. FIG. 2 is similar to FIG. 1 but depicts different client applications 108 utilizing different server applications 110.

As discussed above, some of the client applications 108 that are configured to securely communicate with a particular server application 110 may utilize strong ciphers whereas other client applications 110 may not support strong ciphers. In other words, not all of the client applications 110 that are associated with a customer may be up-to-date and support the recommended security policies and ciphers. In the example depicted in FIG. 2., the client application 108A supports ciphers 126A that include weak ciphers, and the client application 108B supports ciphers 126B that include one strong cipher and two weak ciphers. The supported ciphers may include fewer or more ciphers than illustrated.

In some examples, the client computing device 102 may not support any ciphers that are supported by the server application 110. In other words, the client application 108 is utilizing weak ciphers that are no longer supported by the current version of the server application 110. For purposes of explanation, a current version of the sever application 110 no longer supports the ciphers 126A but a previous version of the server application 110 does support at least one of the ciphers supported by the client application 108A.

In these cases, a remediation technique may be employed by the service provider to select and utilize a version of the server application 110 that supports at least one of the weak ciphers utilized by the client application 108A. As illustrated, server application 110A is selected and executed to connect with client application 108A using secure channel 114A utilizing one or more of the supported ciphers 126A. In this way, the client application 108A will still be able to operate without causing a disruption in service. When the client application 108A is updated to include a supported protocol and/or cipher, a more current version of the server application 110 may be utilized.

Client application 108B supports ciphers 126B that includes one strong cipher. In the current example, server application 110B (e.g., the current version of the server application 110) supports the strong cipher. As such, the server application 110B communicates with the client application 108B using secure channel 114B, which is more secure compared to secure channel 114A. While two different versions of server application 110 are illustrated, there may be more versions of server application 110 that may be utilized.

Figure 3:
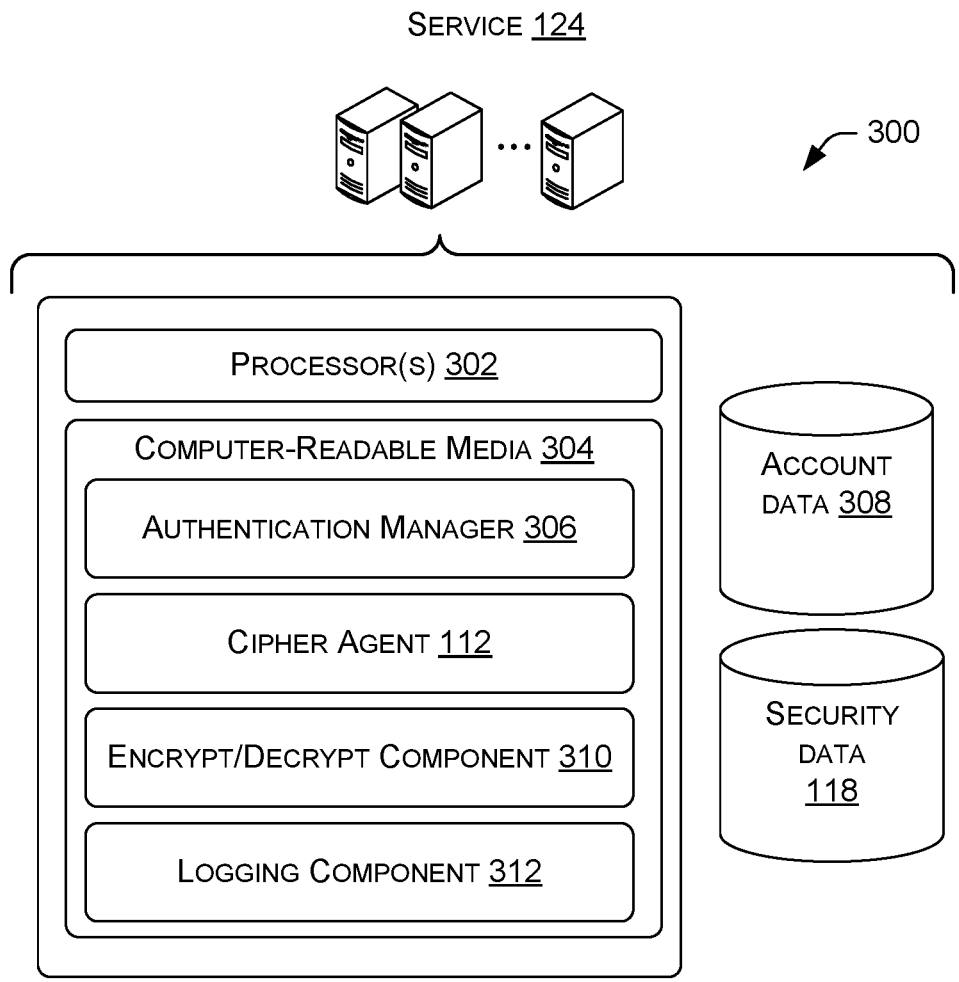
FIG. 3 is a computing system diagram illustrating a configuration for a computing device that can be utilized to implement aspects of the technologies disclosed herein.

FIG. 3 is a block diagram of an illustrative computing architecture 300 of the service 124 shown in FIG. 1. The computing architecture 300 may be implemented in a distributed or non-distributed computing environment.

The computing architecture 300 may include one or more processors 302 and one or more computer readable media 304 that stores various modules, applications, programs, or other data. The computer-readable media 304 may include instructions that, when executed by the one or more processors 302, cause the processors to perform the operations described herein for the service 124.

Examples may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, examples may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some examples, the computer-readable media 304 may store an authentication manager 306, a cipher agent 112, an encrypt/decrypt component 310, and a logging component 312, which are described in turn. The components may be stored together or in a distributed arrangement. The computing architecture 300 may include or have access to account data 308 and the security data 118.

The authentication manager 306 may perform authentication of a user of the client computing device 102, and/or the client reporting device 104, and may authorize computing resources to be provided to the user in response to successful authentication and privileges. The authentication manager 306 may access account data 308, which may include privileges associated with the user and possibly other user data. For example, users may sign up for or subscribe to a service, which may include specific privileges for different users. Administrators or other algorithms or humans may specify user privileges for association with users in the account data 308. The privileges may include resources accessibly, types of commands that can or cannot be used by a user, and/or other types of permission and controls.

The cipher agent 112 is configured to monitor handshake messages 116 to identify when a client application 108 is utilizing weak security policies and/or ciphers. In some examples, the cipher agent 112 may provide security data 118 to one or more services (e.g., a monitoring service) for further processing. In other examples, the cipher agent 112 may provide security data 118 to the customer and/or cause a version of a server application 110 to be selected based on the ciphers supported by the client application 108.

The encrypt/decrypt component 310 may facilitate exchange of keys (e.g., public/private keys, symmetric keys, asymmetric keys, etc.) for encryption/decryption of data transmitted between devices. In some examples, communications between the client computing device 102 and the server computing device 106 may first be encrypted by the sending device using one or more encryption/decryption keys and then decrypted by the receiving device using the one or more encryption/decryption keys.

The logging component 312 may capture and store at least some data in the log 120. The logging component 312 may store security data 118 received from the cipher agent 112, the client device 108 and/or outputs/responses from one or more of the server computing devices 106. In some examples, the logging component 312 may store metadata that includes, for example, associations between client applications 110 and commands and outputs, timestamps, error messages, and/or other information. The logging component 312 may be performed at least in part by other services and/or may leverage other services, such as CloudTrail®. In various examples, the logging component 312 and/or the cipher agent 112 may store control plane information associated with client connectivity (e.g., connectivity of the client device 102 with the server computing device 106).

Figure 4:
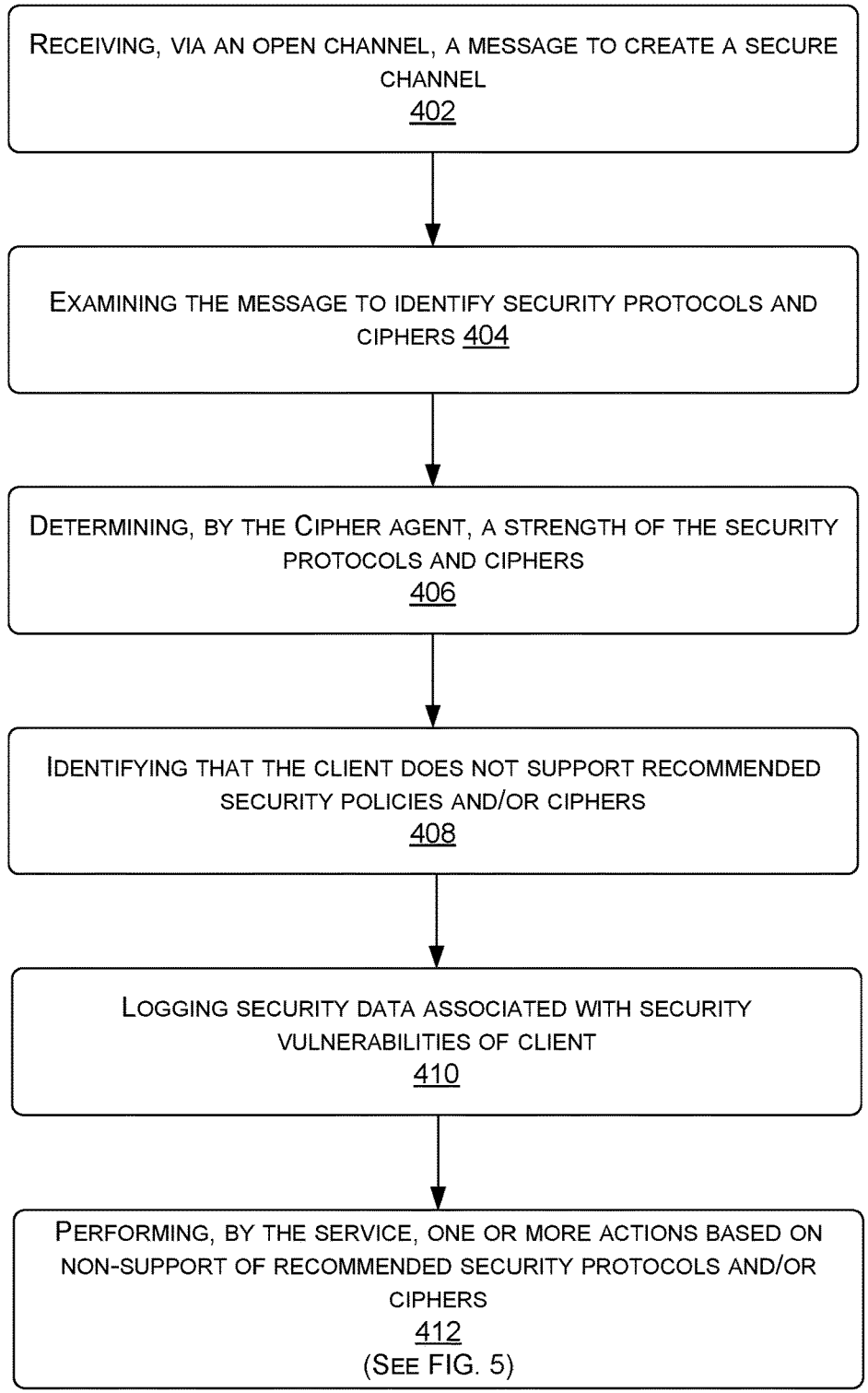
FIG. 4 is a flow diagram showing an illustrative routine for identifying and assisting in mitigating vulnerable security policies.
Figure 5:
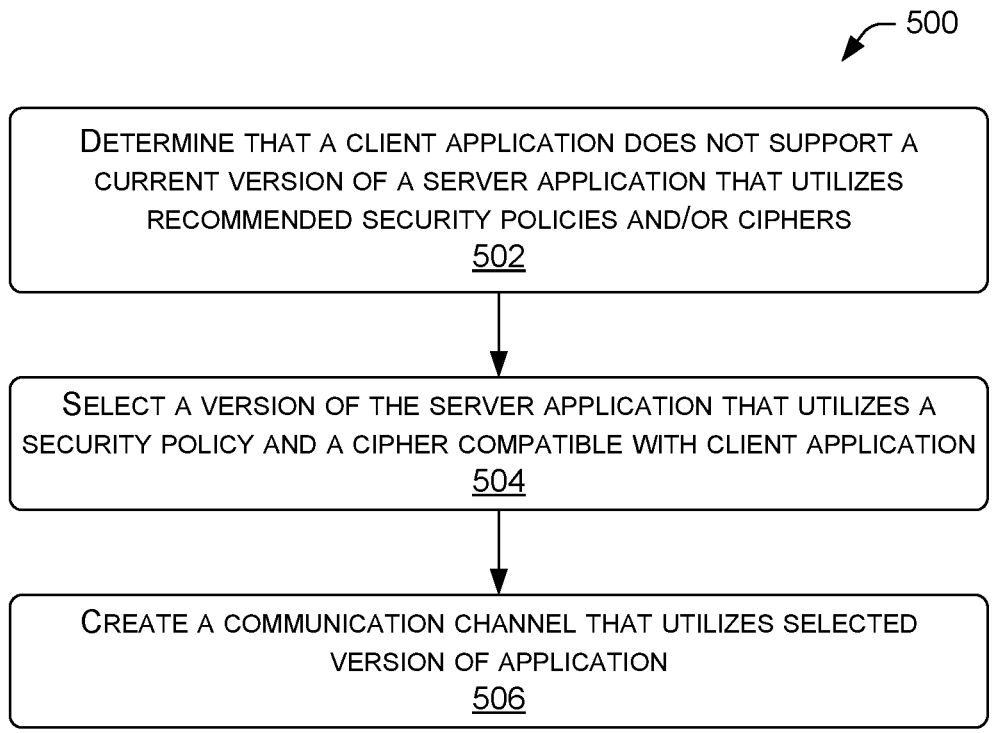
FIG. 5 is a flow diagram showing an illustrative routine for selecting a server application based on ciphers supported by the client application.
Figure 6:
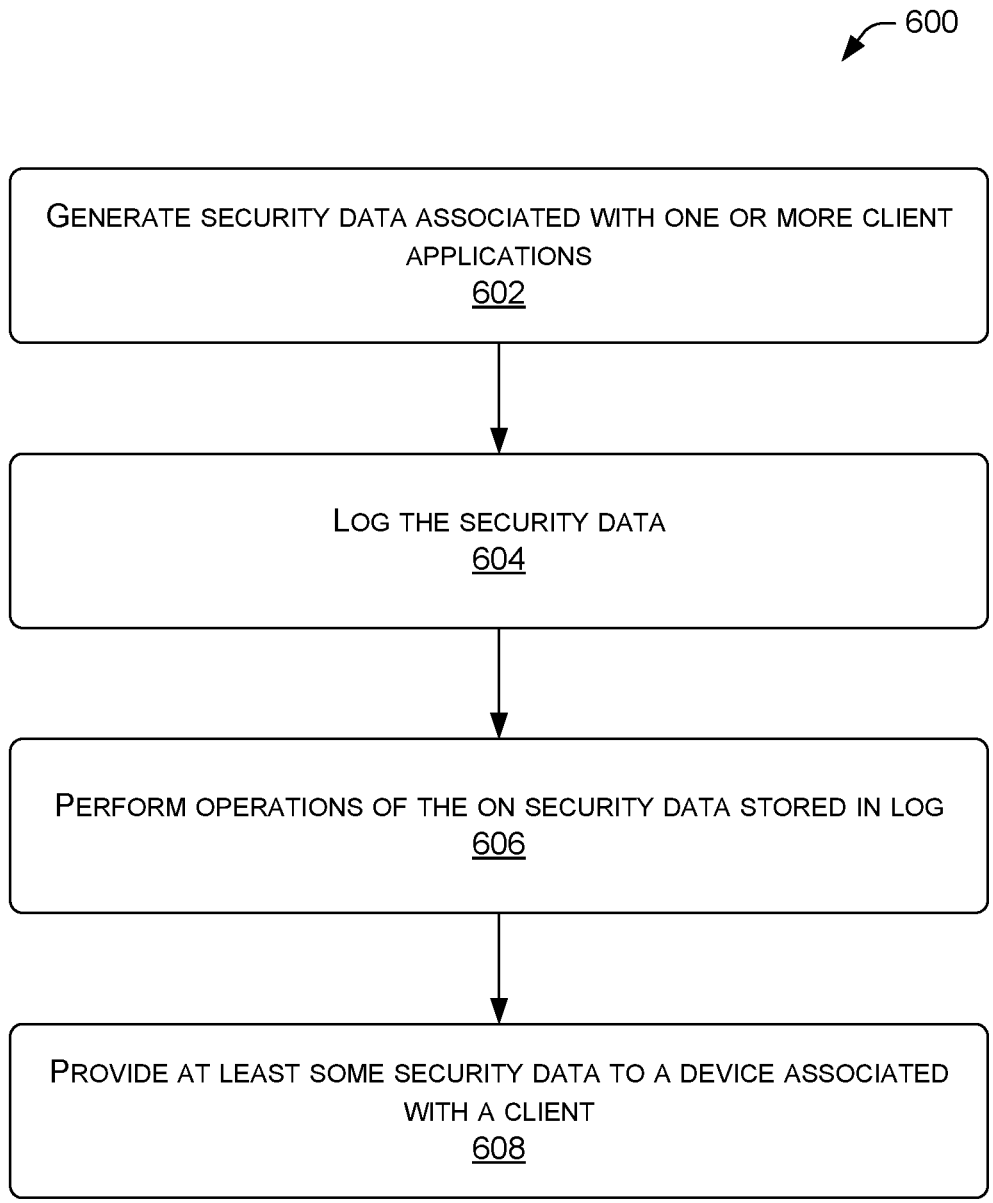
FIG. 6 is a flow diagram showing an illustrative routine for storing and utilizing security data to mitigate security vulnerabilities.

FIGS. 4-6 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 4 is a flow diagram showing an illustrative routine for identifying and assisting in mitigating vulnerable security policies. The process 400 is described with reference to the environment 100, environment 200, and the computing architecture 300 and may be performed in other similar and/or different environments.

At 402, a message is received via an open channel by the server computing device 106 to create a secure channel 114. In some examples, the request may be received by the cipher agent 112 that executes on a computing resource provided by service 124. As discussed above, the message may be a SSL handshake message 116 that negotiates which SSL ciphers and protocols to utilize.

At 404, the handshake message 116 is examined to identify the supported security policies and/or ciphers. For example, the cipher agent 112 may identify the supported ciphers and security policies of the client application 108 by examining the contents of the handshake message 116.

At 406, a strength of the security policies and/or ciphers associated with the client application 108 are determined. As discussed above, the strength may be determined from a security publication and/or determined using other techniques and/or information. For instance, the cipher agent 112 may calculate a score based on an age of the cipher, a complexity of the cipher, whether the cipher has been broken, a strength score of the cypher assigned by a security report, and the like. In other examples, if a cipher is not supported by the current version of the server application 110, the cipher agent 112 may determine that the cipher is weak.

At 408, the cipher agent 112 identifies that the client application 108 does not support the recommended security policies and/or ciphers. As discussed above, the cipher agent 112 may determine that the client application 108 does not support one or more of the currently supported ciphers of the server application 110.

At 410, the cipher agent 112 and/or the logging component 312 may store security data 118 associated with identified security vulnerabilities of the client application. For example, the cipher agent 112 and/or the logging component 312 may store information associated with connection of the client device 102 with a server computing device 106 in the log 120, or another storage location. The security data 118 may include supported ciphers and/or protocols, a time of the connection (e.g., begin, end, duration, etc.), a user identifier, a client device identifier, and/or other connectivity details.

At 412, one or more actions may be performed based on the determination that the client application 108 does not support strong security policies and/or ciphers. As discussed above, the customer may be notified of the non-compliance along with information on how to mitigate the risk of using out-of-date security policies and/or ciphers. The cipher agent 112 and/or some other component may send security data 118 that causes a version of a server application 110 to be utilized (that supports the security polices and/or ciphers of the client application 108) to establish a secure channel 114 with the client computing device 102.

FIG. 5 is a flow diagram of an illustrative process 500 for selecting a server application based on ciphers supported by the client application. The process 500 is described with reference to the environments 100 and 200 and the computing architecture 300 and may be performed at least in part by the cipher agent 112 and/or other computing resources of service 124. Of course, the process 500 may be performed in other similar and/or different environments.

At 502, the cipher agent 112 determines that the client application 108 does not support the current security policies and/or ciphers. As discussed above, the cipher agent 112 may determine that the client application 108 does not support the security policies and/or the ciphers of a current version of the server application 110.

At 504, a version of the server application 110 that supports at least one of the ciphers utilized by the client application 108 is selected to be utilized to establish a secure channel 114. In this way, the client application 108 will still be able to operate (at a possible security risk) without causing a disruption in service. When the client application 108 is updated to include a supported protocols and/or ciphers, a more current version of the server application 110 may be selected and utilized.

At 506, the secure channel 114 is established using the version of the server application 110 that supports the ciphers of the client application 108.

FIG. 6 is a flow diagram showing an illustrative routine 600 for storing and utilizing security data to address security vulnerabilities. The process 600 is described with reference to the environments 100 and 200, and the computing architecture 300. Of course, the process 600 may be performed in other similar and/or different environments.

At 602, the cipher agent 112 may generate security data 118 that is associated with one or more client applications 108. For example, the cipher agent 112 may store information that identifies the ciphers utilized by one or more client applications 108, along with other information associated with security policies and ciphers. The security data 118 may include different types of information, such as but not limited to how many SSL communications are occurring to and from one or more client computing device 102 that utilize weak ciphers, the weak ciphers utilized, and recommended steps to mitigate these security risk.

At 604, the security data 118 is logged. For example, the cipher agent 112 and/or the logging component 312 may store the security data 118 in the log 120. In some examples, the logging component 312 may also store metadata associated with the security data 118 in the log 120, such as a time stamp or other information. In various examples, other applications and/or services may be used to capture security data 118, and/or provide the security data to the log 120.

In some examples, the security data 118 may be encrypted. The encryption may be the same as an encryption used to transport the data from the client device and/or from the server computing device. In this situation, the encryption/decryption keys may be held by those respective devices. In various examples, the log data may be encrypted/decrypted with different keys, possibly to enable simplified retrieval by authorized parties (e.g., an administrator).

At 606, operations may be performed on the data stored in the log 120. In some examples, the logging component 312 may generate analytics based on requests, such as human request, machine request, and/or using standard or scheduled reporting requests, among other possible types of requests. The analytics may be used to determine at least one of ciphers and/or protocols utilized, a type of computing usage, machine performance, fault investigation, recovery, and/or may be used for auditing purposes and/or forensics purposes. In some examples, an administrator may create criteria for the analysis, such as to generate outputs when client applications 108 request a secure channel 114 using weak ciphers, when and by whom certain computing resources are requested, and so forth.

At 608, at least a portion of the security data 118 from the log may be provided to a device associated with the customer. As discussed above, the device may be a client reporting device 104 that is different than the client computing device 102 and the server computing device 106. The cipher agent 112, and/or the logging component 312 may provide the security data 118, such as in response to a request or query of the security data 118 stored within the log 120.

Figure 7:
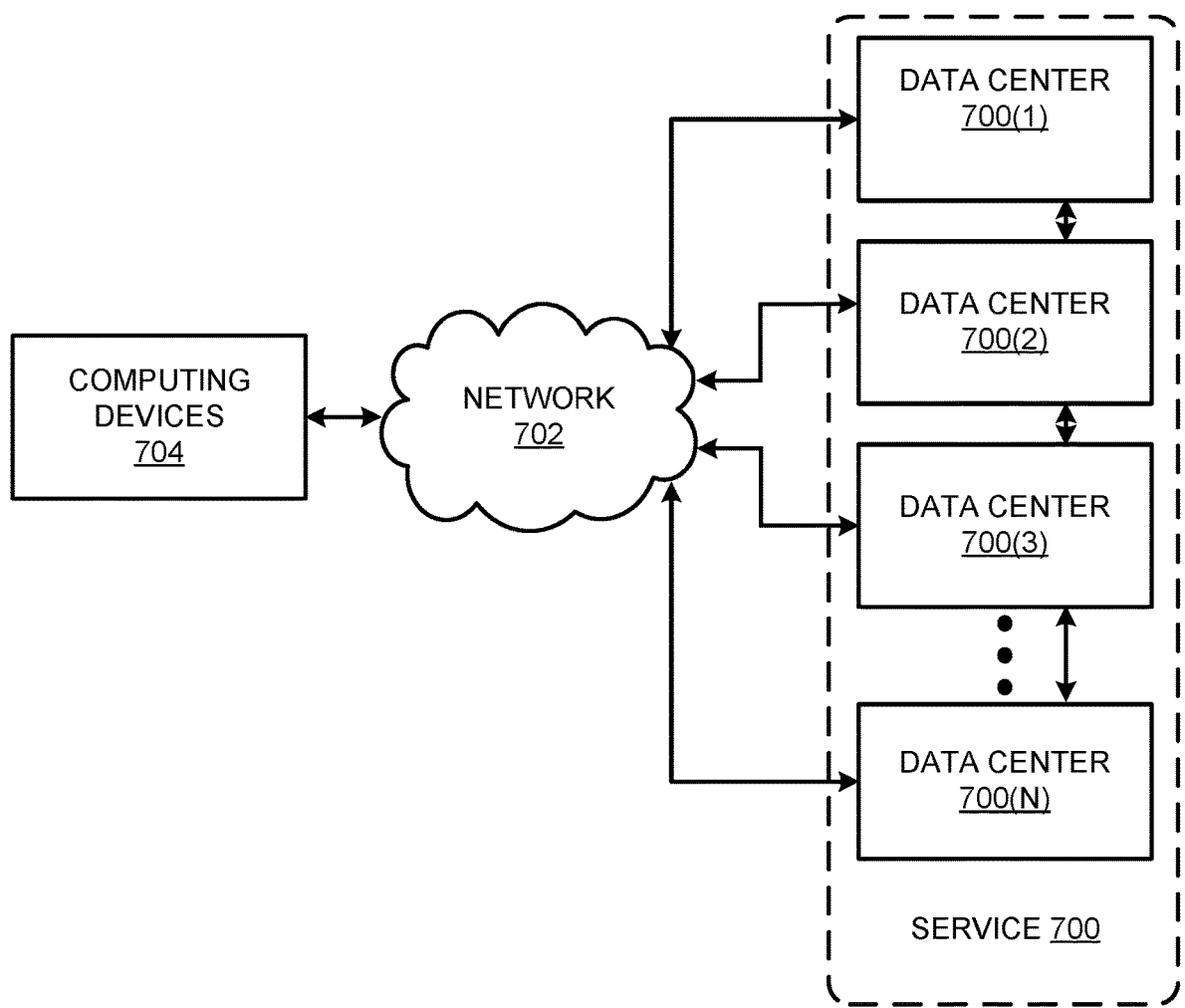
FIG. 7 is a system and network diagram that shows an illustrative operating environment that includes a system that can be configured to implement aspects of the functionality described herein.

FIG. 7 is a system and network diagram that shows an illustrative operating environment that includes a service 700 that can be configured to implement aspects of the functionality described herein. As discussed briefly above, the service can execute network services, such as data storage, and/or provide computing resources, such as for load-balancing, or other functionality, on a permanent or an as-needed basis. Among other types of functionality, the computing resources provided by the system, or by a larger system of which the service is a part, can be utilized to implement the various network services described herein. As also discussed above, the service may be part of a larger service that provides the additional computing resources that include, without limitation, data storage resources, data processing resources, such as virtual machine (VM) instances, networking resources, data communication resources, network services, and other types of resources.

Each type of computing resource provided by the service, or by a larger service of which the system is a part, can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The system, or a larger system of which the system is a part, can also be configured to provide other types of computing resources not mentioned specifically herein.

The computing resources provided by service, or a larger service of which the system is a part, are enabled in one or more implementations by one or more data centers 700(1), 700(2), 700(3), . . . , 700(N). The data centers are facilities utilized to house and operate computer systems and associated components. The data centers typically include redundant and backup power, communications, cooling, and security systems. The data centers can also be located in geographically disparate locations. One illustrative configuration for a data center that can be utilized to implement the technologies disclosed herein will be described below with regard to FIG. 8.

The users of the service can access the computing resources, such as service 124, provided by the service over a network 702, which can be a wide area communication network ("WAN"), such as the Internet, an intranet or an Internet service provider ("ISP") network or a combination of such networks. For example, and without limitation, a computing device 704 (e.g., one or more of the computing devices 102 and/or the client security device 104) operated by a user of the service can be utilized to access the service by way of the network 702. It should be appreciated that a local-area network ("LAN"), the Internet, or any other networking topology known in the art that connects the data centers to remote users and other users can be utilized. It should also be appreciated that combinations of such networks can also be utilized.

FIG. 8 is a computing system diagram that illustrates an example for a data center 700(N) that can be utilized to implement the service 124 as described above in FIGS. 1-8, and/or any other network services disclosed herein, such as the computing devices (i.e., computing instances) 106 and/or the cipher agent 112. The example data center 700(N) shown in FIG. 8 includes several server computers 800A-800E (collectively 800) for providing the computing resources 802A-802E (collectively 802), respectively.

Figure 8:
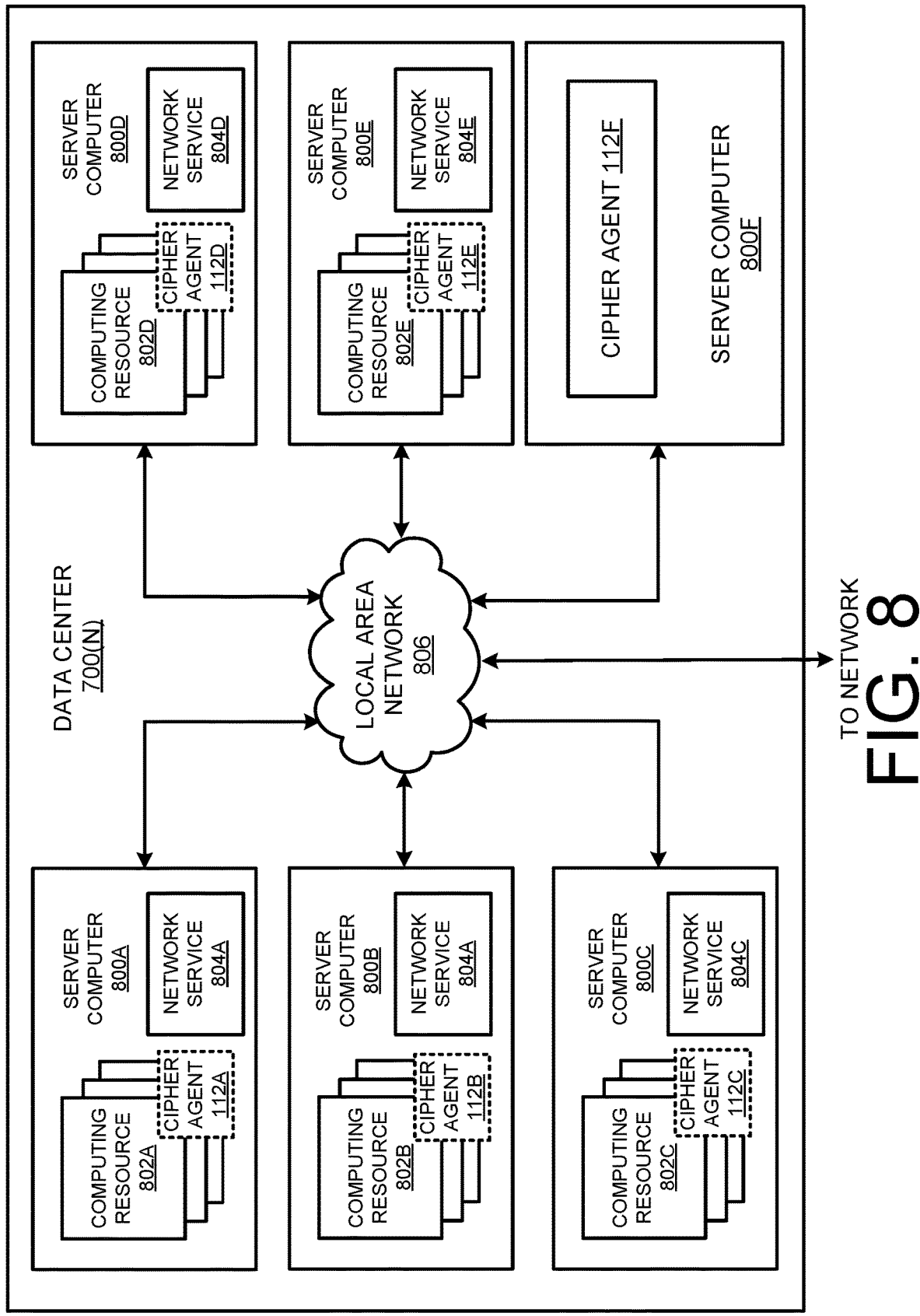
FIG. 8 is a computing system diagram illustrating a configuration for a data center that can be utilized to implement aspects of the technologies disclosed herein.

The server computers 800 can be standard tower, rack-mount, or blade server computers configured appropriately for providing the various computing resources described herein (illustrated in FIG. 8 as the computing resources 802A-802E). As mentioned above, the computing resources 802 provided by the service, or a larger service of which the service is a part, can include, without limitation, analytics applications, data storage resources, data processing resources such as VM instances or hardware computing systems, database resources, networking resources, and others. Some of the servers 800 can also be configured to execute network services 804A-804E (collectively 804) capable of instantiating, providing and/or managing the computing resources 802, some of which are described in detail herein.

The data center 700(N) shown in FIG. 8 also includes a server computer 800F that can execute some or all of the software components described above. For example, and without limitation, the server computers 800A-800F can be configured to execute the cipher agent 112 and functionality of the service 124. The server computers 800-A800F can also be configured to execute other components and/or to store data for providing some or all of the functionality described herein. In this regard, it should be appreciated that components or different instances of the service can execute on many other physical or virtual servers in the data centers 700 in various configurations.

In the example data center 700(N) shown in FIG. 8, an appropriate LAN 806 is also utilized to interconnect the server computers 800A-800F. The LAN 806 is also connected to the network 702 illustrated in FIG. 7. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 700(1)-(N), between each of the server computers 800A-800F in each data center 700, and, potentially, between computing resources 802 in each of the data centers 700. It should be appreciated that the configuration of the data center 800 described with reference to FIG. 8 is merely illustrative and that other implementations can be utilized.

Figure 9:
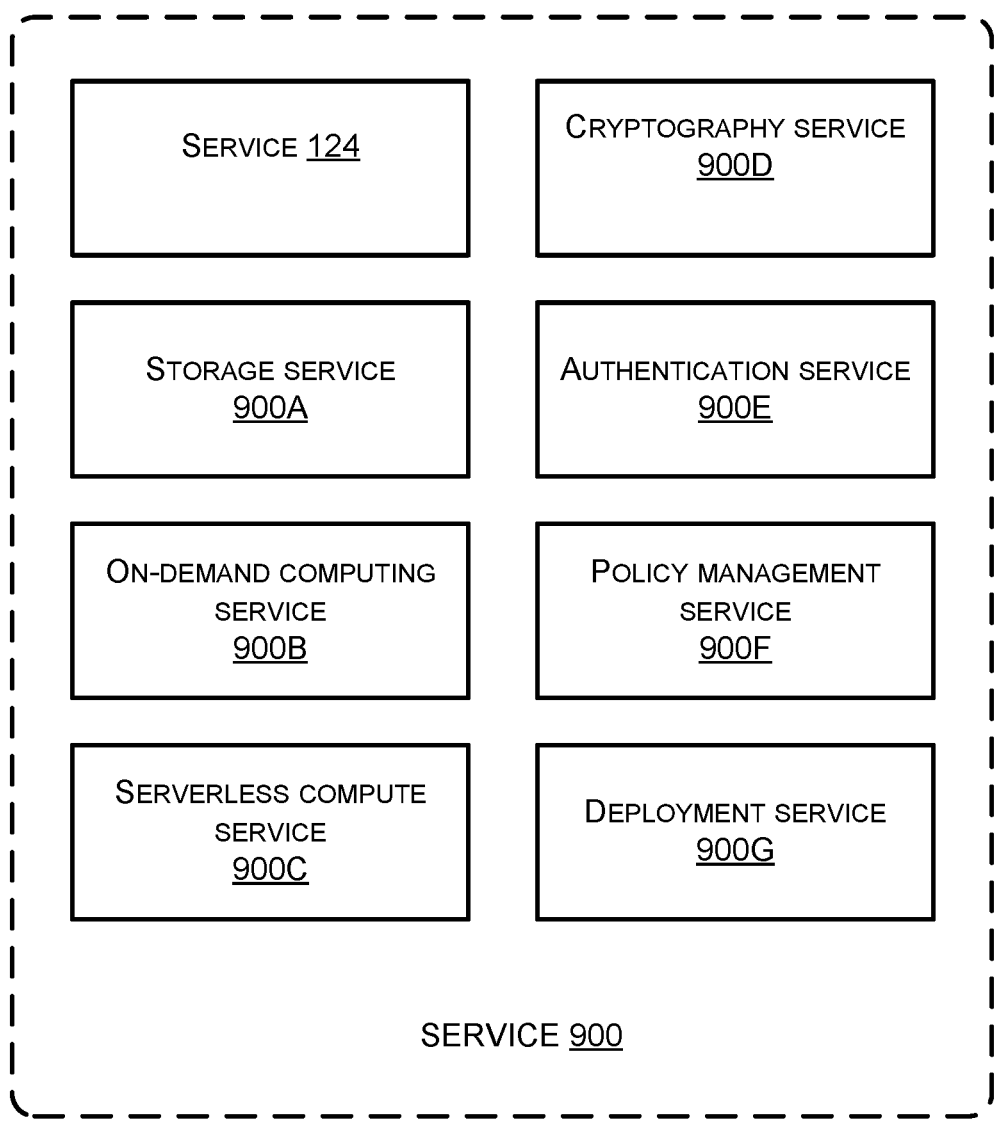
FIG. 9 is a network services diagram that shows aspects of several services that can be provided by and utilized within a system, or a larger system of which the system is a part, which is configured to implement the various technologies disclosed herein.

FIG. 9 is a network services diagram that shows aspects of several services that can be provided by and utilized within the services system 700, or a larger service of which the service is a part, which is configured to implement the various technologies disclosed herein. In particular, and as discussed above, the service can provide a variety of network services to users and other users including, but not limited to, the service 124 and/or the computing instance 106, a storage service 900A, an on-demand computing service 900B, a serverless compute service 900C, a cryptography service 900D, an authentication service 900E, a policy management service 900F, and a deployment service 900G. The system, or a larger system of which the system is a part, can also provide other types of network services, some of which are described below.

It is also noted that not all configurations described include the network services shown in FIG. 9 and that additional network services can be provided in addition to, or as an alternative to, the services explicitly described herein. Each of the services shown in FIG. 9 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 9 will now be provided.

The storage service 900A can be a network-based storage service that stores data obtained from users of the system, or a larger system of which the system is a part. The data stored by the storage service 900A can be obtained from computing devices of users and/or computing devices and/or resources of the service 124.

The on-demand computing service 900B can be a collection of computing resources configured to instantiate VM instances and to provide other types of computing resources on demand. For example, a user of the system, or a larger system of which the system is a part, can interact with the on-demand computing service 900B (via appropriately configured and authenticated API calls, for example) to provision and operate VM instances that are instantiated on physical computing devices hosted and operated by the system, or a larger system of which the system is a part. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 900B is shown in FIG. 9, any other computer system or computer system service can be utilized in the service, or a larger service of which the service is a part, to implement the functionality disclosed herein, such as a computer system or computer system service that does not employ virtualization and instead provisions computing resources on dedicated or shared computers/servers and/or other physical devices.

The serverless compute service 900C is a network service that allows users to execute code (which might be referred to herein as a "function") without provisioning or managing server computers in the system, or a larger system of which the system is a part. Rather, the serverless compute service 900C can automatically run code in response to the occurrence of events. The code that is executed can be stored by the storage service 900A or in another network accessible location.

In this regard, it is to be appreciated that the term "serverless compute service" as used herein is not intended to infer that servers are not utilized to execute the program code, but rather that the serverless compute service 900C enables code to be executed without requiring a user to provision or manage server computers. The serverless compute service 900C executes program code only when needed, and only utilizes the resources necessary to execute the code. In some configurations, the user or entity requesting execution of the code might be charged only for the amount of time required for each execution of their program code.

The service can also include a cryptography service 900D. The cryptography service 900D can utilize storage services, such as the storage service 900A, to store encryption keys in encrypted form, whereby the keys can be usable to decrypt user keys accessible only to particular devices of the cryptography service 900D. The cryptography service 900D can also provide other types of functionality not specifically mentioned herein.

The service in various configurations, also includes an authentication service 900E and a policy management service 900F. The authentication service 900E, in some examples, is a computer system (i.e., collection of computing resources 1002) configured to perform operations involved in authentication of users or customers. For instance, one of the services shown in FIG. 9 can provide information from a user or customer to the authentication service 900E to receive information in return that indicates whether or not the requests submitted by the user or the customer are authentic.

The policy management service 900F, in one example, is a network service configured to manage policies on behalf of users or customers of the system, or a larger system of which the system is a part. The policy management service 900F can include an interface (e.g. API or GUI) that enables customers to submit requests related to the management of policy, such as a security policy. Such requests can, for instance, be requests to add, delete, change or otherwise modify policy for a customer, service, or system, or for other administrative actions, such as providing an inventory of existing policies and the like.

The service can additionally maintain other network services based, at least in part, on the needs of its customers. For instance, the service can maintain a deployment service 900G for deploying program code in some configurations. The deployment service 900G provides functionality for deploying program code, such as to virtual or physical hosts provided by the on-demand computing service 900B. Other services include, but are not limited to, database services, object-level archival data storage services, and services that manage, monitor, interact with, or support other services. The service can also be configured with other network services not specifically mentioned herein in other configurations.

Figure 10:
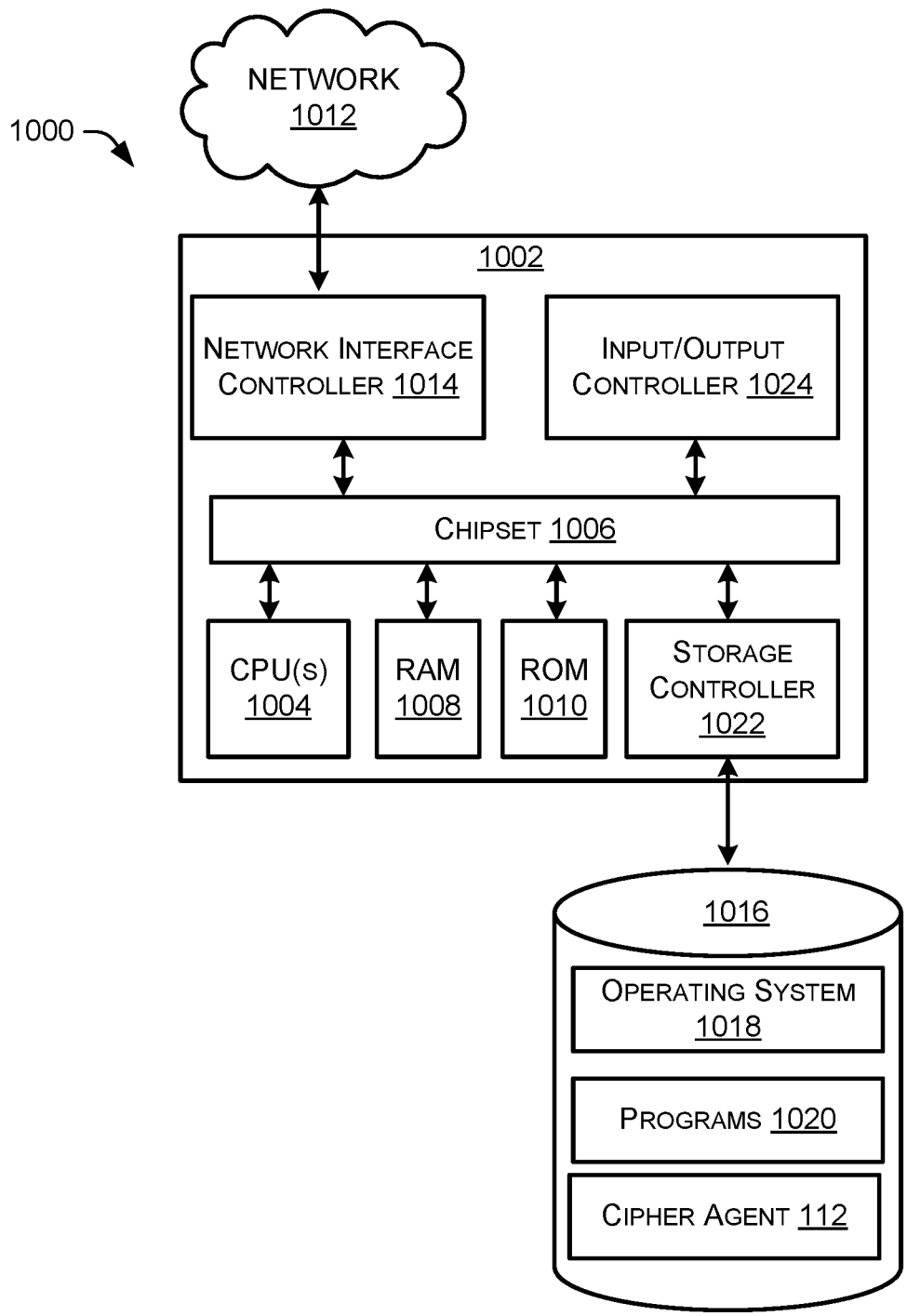
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein. The computer 1000 may represent architecture for a naming service, a concentrator, a reader, and/or other devices described herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 1012. The chipset 1006 can include functionality for providing network connectivity through a NIC 1014, such as a gigabit Ethernet adapter. The NIC 1014 is capable of connecting the computer 1000 to other computing devices over the network 1012. It should be appreciated that multiple NICs 1014 can be present in the computer 1000, connecting the computer to other types of networks and remote computer systems.

The computer 1000 can be connected to a mass storage device 1016 that provides non-volatile storage for the computer. The mass storage device 1016 can store an operating system 1018, programs 1020, and data, which have been described in greater detail herein. The mass storage device 1016 can be connected to the computer 1000 through a storage controller 1022 connected to the chipset 1006. The mass storage device 1016 can consist of one or more physical storage units. The storage controller 1022 can interface with the physical storage units through a serial attached SCSI ("SAS") interface, a serial advanced technology attachment ("SATA") interface, a fiber channel ("FC")

interface, or other type of interface for physically connecting and transferring data between computers and physical storage units.

The computer 1000 can store data on the mass storage device 1016 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1016 is characterized as primary or secondary storage, and the like.

For example, the computer 1000 can store information to the mass storage device 1016 by issuing instructions through the storage controller 1022 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1016 by detecting the physical states or characteristics of one or more particular locations within the physical storage units.

In addition to the mass storage device 1016 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1016 can store an operating system 1018 utilized to control the operation of the computer 1000. According to some examples, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1016 can store other system or application programs and data utilized by the computer 1000.

In some configurations, the mass storage device 1016 or other computer-readable storage media is encoded with computer-executable instructions which, when loaded into the computer 1000, transform the computer from a general-purpose computing system into a special-purpose computer capable of implementing the configurations described herein. These computer-executable instructions transform the computer 1000 by specifying how the CPUs 1004 transition between states, as described above. According to one configuration, the computer 1000 has access to computer-readable storage media storing computer-executable instructions which, when executed by the computer 1000, perform the various processes described above. The computer 1000 can also include computer-readable storage media for performing any of the other computer-implemented operations described herein.

The computer 1000 can also include one or more input/output controllers 1024 for receiving and processing input from a number of input devices, such as a keyboard, a mouse, a touchpad, a touch screen, an electronic stylus, or other type of input device. Similarly, an input/output controller 1024 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or can utilize an architecture completely different than that shown in FIG. 10.

Based on the foregoing, it should be appreciated that technologies for identifying and mitigating vulnerable security policies have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. One or more non-transitory computer-readable media storing executable instructions that, when executed, cause one or more computing devices to perform acts comprising:
monitoring handshake messages to identify requests to create a secure channel between a client application that executes on a client device and a server application that executes on a Virtual Machine (VM) hosted by the one or more computing devices;
identifying, based at least in part on data of the handshake messages, ciphers supported by the client application;
determining that the ciphers supported by the client application are not supported by a first version of the server application;
storing security data that identifies the ciphers, wherein the security data indicates that the ciphers are weak ciphers based, at least in part on, determining that the ciphers supported by the client application are not supported by a first version of the server application;
selecting, based at least in part on the data of the handshake messages, a first cipher from among the ciphers supported by the client application;

selecting, based at least in part on the first cipher, a second version of the server application that supports the first cipher; and establishing the secure channel between the client application and the second version of the server application utilizing the first cipher.

2. The one or more non-transitory computer-readable media as recited in claim 1, wherein the acts further comprise providing at least a portion of the security data and other data that indicates one or more mitigating steps to update the ciphers to one or more second computing devices associated with a customer associated with the client device.

3. The one or more non-transitory computer-readable media as recited in claim 1, wherein the acts further comprise:

determining that utilizing the first version of the server application would result in the secure channel not being established; and preventing an update of the second version of the server application utilized by the client application for a period of time such that the client application may be updated.

4. The one or more non-transitory computer-readable media as recited in claim 1, wherein the acts further comprise outputting at least some log information from a log to one or more second computing devices associated with a customer associated with the client device, the log information including a number of Secure Sockets Layer (SSL) communications are occurring to and from one or more instances of the client application that utilize the weak ciphers, the ciphers utilized, and recommended steps to mitigate a security risk.

5. A system comprising:
one or more processors; and
memory to store computer-executable instructions that, when executed, cause the one or more processors to perform acts comprising:

determining, based at least in part on a handshake message, a request to create a secure channel between a client computing device and a server computing device;

identifying, based at least in part on the handshake message, one or more ciphers supported by the client computing device;

determining that the one or more ciphers are unsupported by a current version of an application executed by the server computing device;

determining, based at least in part on the handshake message, a first cipher from among the one or more ciphers supported by the client computing device;

determining, based at least in part on the first cipher, a second version of the application executed by the server computing device that supports the first cipher; and establishing the secure channel between the client computing device and the second version of the application executed by the server computing device utilizing the first cipher.

6. The system as recited in claim 5, wherein the acts further comprise causing a display of data that indicates one or more security vulnerabilities associated with the client computing device.

7. The system as recited in claim 5, wherein the acts further comprise causing a storage of data that indicates one or more security vulnerabilities associated with the client computing device.

8. The system as recited in claim 5, wherein the acts further comprise determining a strength of the one or more ciphers supported by the client computing device, and wherein determining that the one or more ciphers are unsupported is based, at least in part, on the strength of the one or more ciphers, wherein the strength of the one or more ciphers indicates a probability that the one or more ciphers can be broken.

9. The system as recited in claim 5, wherein the acts further comprise:

identifying a second client computing device that supports the current version of the application executed by the server computing device; and creating a second secure channel between the second client computing device and the current version of the application executed by the server computing device.

10. The system as recited in claim 5, wherein the server computing device is a virtual machine hosted by a service provider within a service provider network; and wherein the virtual machine is configured to execute different versions of the application executed by the server computing device that are utilized to establish different secure channels.

11. The system as recited in claim 5, wherein the server computing device provides functionality of a first service hosted by a service provider network that is utilized by the client computing device.

12. The system as recited in claim 5, wherein the acts further comprise receiving authorization to determine the request to create the secure channel between the client computing device and the server computing device.

13. A computer-implemented method comprising:

determining, by a server computing device and based at least in part on a handshake message, a request to create a secure channel between a client computing device and the server computing device;

identifying, by the server computing device and based at least in part on the handshake message, one or more ciphers supported by the client computing device;

determining, by the server computing device, that the one or more ciphers are unsupported by a current version of an application executed by the server computing device;

determining, by the server computing device and based at least in part on the handshake message, a first cipher from among the one or more ciphers supported by the client computing device;

determining, by the server computing device and based at least in part on the first cipher, a second version of the application executed by the server computing device that supports the first cipher; and establishing the secure channel between the client computing device and the second version of the application executed by the server computing device utilizing the first cipher.

14. The computer-implemented method as recited in claim 13, further comprising causing a storage of data that indicates one or more security vulnerabilities associated with the client computing device.

15. The computer-implemented method as recited in claim 13, further comprising causing a display of data that indicates one or more security vulnerabilities associated with the client computing device within a user interface.

16. The computer-implemented method as recited in claim 15, wherein the user interface provides a second display of the one or more ciphers that are unsupported by a current version of the application executed by the server computing device.

17. The computer-implemented method as recited in claim 13, further comprising:
   accessing a security recommendation;
   determining, based at least in part on the security recommendation, a strength of the one or more ciphers supported by the client computing device; and
   determining that the one or more ciphers are unsupported based, at least in part, on the strength of the ciphers.

18. The computer-implemented method as recited in claim 13, wherein the server computing device is a virtual machine provided by a service provider within a service provider network, and wherein the server application is a load balancing application.

19. The computer-implemented method as recited in claim 13, further comprising receiving authorization to monitor the request to create the secure channel between the client computing device and the server computing device.

20. The computer-implemented method as recited in claim 13, further comprising providing data that indicates one or more mitigating steps to update the one or more ciphers to one or more second client computing devices associated with a customer of a service provider network.

* * * * *